United States Patent [19]

Makansi

[11] Patent Number: 5,121,369
[45] Date of Patent: Jun. 9, 1992

[54] METHOD AND APPARATUS FOR DIRECT OVERWRITING INFORMATION ON A MAGNETO-OPTICAL RECORDING MEDIUM USING CONSTANT LASER BEAM MODULATED MAGNETIC FIELD GENERATOR

[75] Inventor: Tarek Makansi, Pleasanton, Calif.

[73] Assignee: International Business Machines Corporation, Armonk, N.Y.

[21] Appl. No.: 357,511

[22] Filed: May 25, 1989

[51] Int. Cl.⁵ .................... G11B 13/04; G11B 11/12
[52] U.S. Cl. .................................. 369/13; 360/114; 360/66
[58] Field of Search .............. 369/13; 360/59, 114, 360/66; 365/122

[56] References Cited

U.S. PATENT DOCUMENTS

| | | | |
|---|---|---|---|
| 3,521,294 | 7/1970 | Treves | 360/59 X |
| 4,712,203 | 12/1987 | Saito et al. | 369/13 |
| 4,805,043 | 2/1989 | Doyle | 360/59 |
| 4,872,078 | 10/1989 | Gerber et al. | 360/59 |
| 4,907,211 | 3/1990 | Horimai et al. | 360/114 X |

FOREIGN PATENT DOCUMENTS

| | | |
|---|---|---|
| 3008692 | 3/1980 | Fed. Rep. of Germany. |
| 55-132521 | 10/1980 | Japan. |
| 63-34756 | 2/1988 | Japan .................... 360/114 |

OTHER PUBLICATIONS

Nakao, et al., "High Speed Overwritable Magneto-Optic Recording", Japanese Journal of Applied Physics, vol. 26 (1987) Supplement 26-4, pp. 149-154.

*Primary Examiner*—Stuart S. Levy
*Assistant Examiner*—Hoa Nguyen
*Attorney, Agent, or Firm*—Henry E. Otto; Douglas R. Millett

[57] ABSTRACT

Direct overwriting of encoded data along a track in a magneto-optic recording medium is described. A laser beam, not modulated by data, is directed at the active side of the medium to locally heat the width of one track for conditioning it for direct overwriting. A magnetic head comprising an inductor and a capacitance in parallel with the inductor is movable in an appropriate manner to a selectable track. While the head is in alignment with the beam, current of a preselected polarity is supplied from a current source to the inductor. The current source is disconnected to reverse the field of the magnetic head by reciprocation of energy between the inductor and capacitance. Once the magnetic field is reversed, current is supplied to the inductor for maintaining the field until the next field reversal, the reversal times being determined by the data to be written.

14 Claims, 5 Drawing Sheets

METHOD AND APPARATUS FOR DIRECT OVERWRITING INFORMATION ON A MAGNETO-OPTICAL RECORDING MEDIUM USING CONSTANT LASER BEAM MODULATED MAGNETIC FIELD GENERATOR

TECHNICAL DESCRIPTION

This invention relates to a method and apparatus for direct overwriting of data on a magneto-optic disk without requiring modulation of a laser beam by data, and relates more particularly to such a method and apparatus that employs a unique circuit configuration for controlling field reversal of a magnetic head.

BACKGROUND OF THE INVENTION

Direct overwriting is desirable to provide improved performance by not requiring a revolution of the disk for erasing data. It also provides better control of mark lengths relative to space lengths and permits higher linear densities through partial response signalling.

To achieve direct overwriting in magneto-optic recording, the magnetic field of a magnetic head must be switched faster than the encoded bit rate. In systems where the magnetic head must be about a millimeter away from the active layer, the large volume of magnetic field needed for writing under such conditions requires high power to switch the field rapidly.

U.S. Pat. No. 4,872,078 issued Oct. 3, 1989, assigned to the assignee of the present invention, describes a method whereby direct overwrite is achieved by a resonant circuit approach. Data may be directly overwritten by locally heating the active layer of the magneto-optic medium with a short pulse of laser light in the presence of a periodically alternating magnetic field produced by a high frequency resonant coil. By selecting the duration of the laser pulse to be a small fraction of the period of the alternating magnetic field and controlling the timing of the pulse with respect to the phase of the alternating magnetic field, marks of varying length can be written. This technique desirably permits multiple beam recording, in which each beam is properly synchronized with a global resonating field. However, this resonant coil technique requires synchronizing the laser pulses with the coil current; and mark edges cannot be placed arbitrarily, which leads to special code constraints that reduce the code rate and linear density.

The Japanese Journal of Applied Physics, Vol. 26 (1987) at pp. 149-154 describes a technique whereby direct overwriting is achieved by use of a magnetic head which floats on an air-bearing slider, as in magnetic disk recording. The magnetic head produces a magnetic field that can be switched rapidly due to the low field volume. However, the circuitry for controlling the switching of the magnetic field is not disclosed. Moreover, a number of practical problems arise using this approach; e.g., aligning the pole piece with the focused beam, restriction of the technique to use with single-sided media, and the need for a clean environment to avoid head crashes. This reference cites, as prior art, a direct overwriting approach employing a fixed low-frequency magnetic head with wide spacing between the head and medium; and, because the head has to produce a large magnetic field to provide the field over a wide area, a large magnetic coil with a slow switching time must be used to apply an effective magnetic field to the medium.

Thus, prior approaches to direct overwriting have involved either resonating the magnetic field with the electric field of a capacitor or reducing the field volume considerably by bringing the magnet close to the active layer.

There is a need for an improved method and apparatus for direct overwriting on magneto-optic media and which, in combination, provides the following advantages: (1) a circuit arrangement that permits high speed switching of the magnetic field with less energy than required by previously proposed techniques; (2) permits patterns to be written without code constraints; (3) does not require operation of the coil of a magnetic head in a resonant mode; and (4) does not require a magnetic head that flies above the media.

SUMMARY OF THE INVENTION

Toward this end, and according to the invention, direct overwriting of encoded data along a track in a magneto-optic recording medium is achieved by directing a laser beam, not modulated by data, at a selectable track on the active side of the medium to locally heat the medium for conditioning it for direct overwriting. A magnetic head comprising an inductor and a capacitance in parallel with the inductor is movable in an appropriate manner to a selectable track. While the head is in alignment with the beam, current of one polarity is supplied from a current source to the inductor. The current source is disconnected to reverse the field of the magnetic head by reciprocation of energy between the inductor and capacitance. Once the magnetic field is reversed, current is supplied to the inductor for maintaining the field until the next field reversal, the reversal times being determined by the data to be written.

For pulse width modulation recording, the current normally supplied to the inductor is of one polarity and that supplied following the reversal is of opposite polarity; whereas for pulse position modulation recording, the current supplied to the inductor is of the same polarity before and after reversal.

The inductor is preferably mounted for movement on a voice coil actuator and thereby maintained at a predetermined fixed distance from the medium.

DESCRIPTION OF PREFERRED EMBODIMENTS

Figure 1:
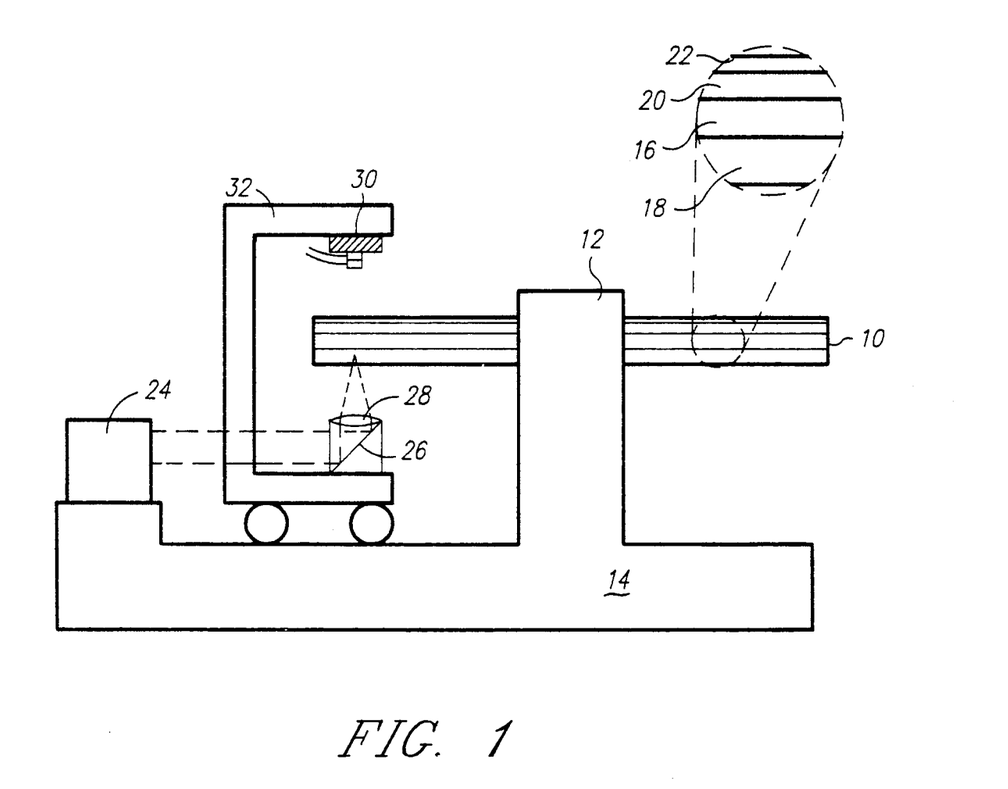
FIG. 1 is a schematic diagram of an apparatus according to the invention which permits direct overwriting of data on a magneto-optic medium.

As illustrated in FIG. 1, a magneto-optic disk 10 is mounted on a spindle 12 that is rotatable by suitable means (not shown) and appropriately supported on a suitable stationary base 14. As illustrated, disk 10 comprises an active layer 16 interposed between a clear substrate 18 and a reflective layer 20 that is overcoated with a protective layer 22—a configuration that is conventional. A diode laser 24 directs a beam of collimated light via a mirror 26 and a focusing lens 28 onto the active layer 16. Mirror 26 and lens 28 are aligned with a magnetic head 30 that is adjacent the opposite (i.e., protective layer) side of disk 10. Mirror 26, lens 28 and head 30 are preferably mounted on a member 32, such as a voice coil actuator, that moves them in unison radially to a selected track on disk 10. Light projected by the laser beam onto the disk locally heats a region on the selected track to condition it for direct overwriting.

Pulse Width Modulation Recording

Figure 2:
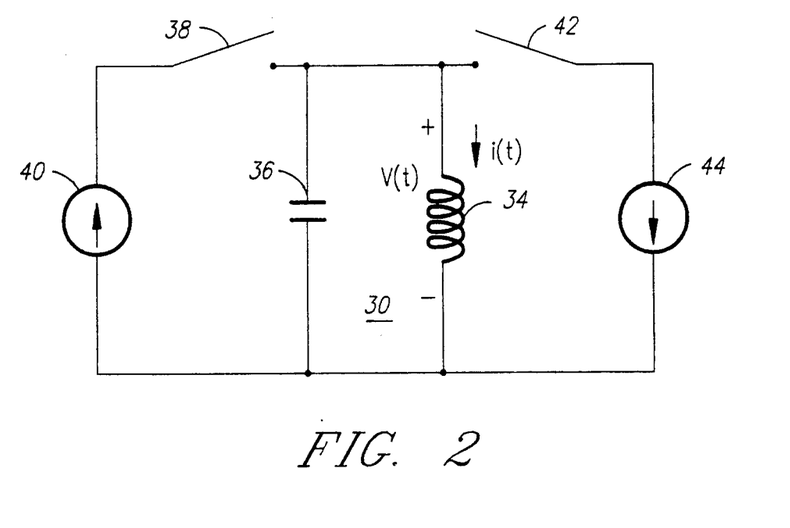
FIG. 2 is a schematic diagram of a switching circuit illustrating the invention for direct overwriting on the medium using pulse width modulation (PWM) recording.

Refer now to FIG. 2, which illustrates the invention. A magnetic head 30 comprises an inductor 34 connected in parallel with a capacitor 36. When a switch 38 is closed in response to a transition in NRZ data, current of one polarity is supplied to inductor 34 from a current source 40. When a switch 42 is closed in response to the next transition, current of opposite polarity is supplied to inductor 34 from a current source 44. Every transition in the NRZ data initiates a reversal of the current through inductor 34 and thus of the magnetic field of head 30, as will be seen by reference to FIGS. 3A and 3B.

Figure 3A:
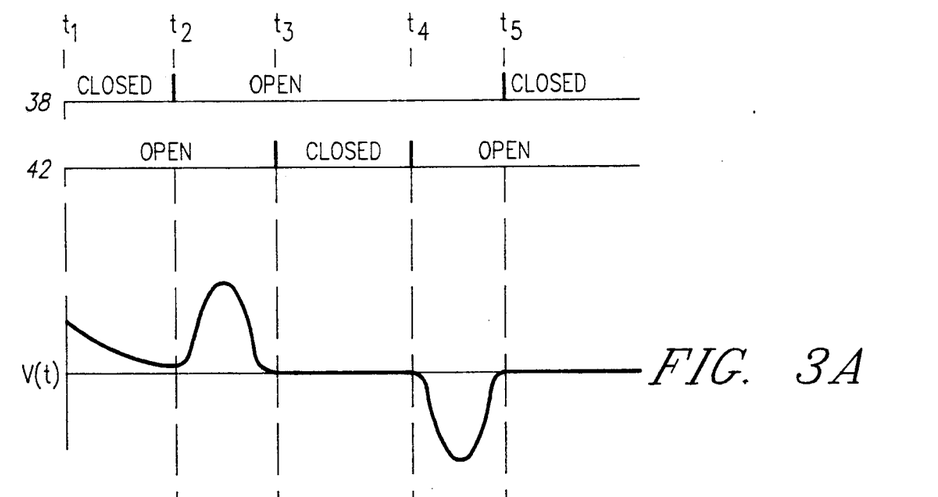
FIGS. 3A and 3B are voltage and current wave forms, respectively, for the circuit of FIG. 2.
Figure 3B:
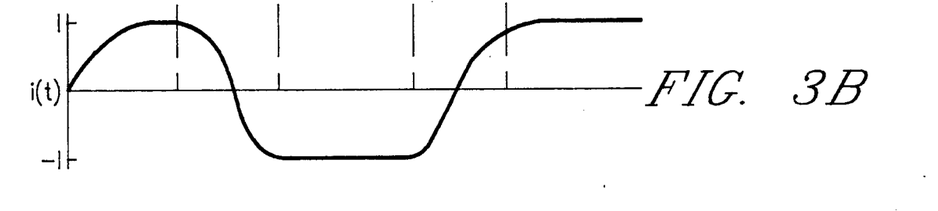

Assume initially that switch 38 is closed and switch 42 is open at time t1 when power is turned on. As the current is supplied from source 40 to inductor 34 at a positive polarity, the voltage across the capacitor will drop to zero. At time t2, when switch 38 is opened, the reciprocation of energy between inductor 34 and capacitor 36 will reverse the field of the magnetic head 30.

As soon as the field is reversed, switch 42 is closed at time t3, while switch 38 remains open. Current source 44 maintains the inductor current until the next transition at time t4. At time t4, when switch 42 is opened, the reciprocation of energy between inductor 34 and capacitor 36 will again reverse the field of head 30; and once the field is reversed, switch 38 is closed at time t5 while switch 42 remains open. Current source 40 now maintains the inductor current until the next transition. Current source 40 or 44, as the case may be, also restores any energy that may have been lost through ohmic resistance between transitions.

Let T be the transition time of the field; i.e., the time required for energy to flow from inductor 34 to capacitor 36 and back to the inductor. Then T is given by $$T = \pi \sqrt{LC}$$

Figure 4:
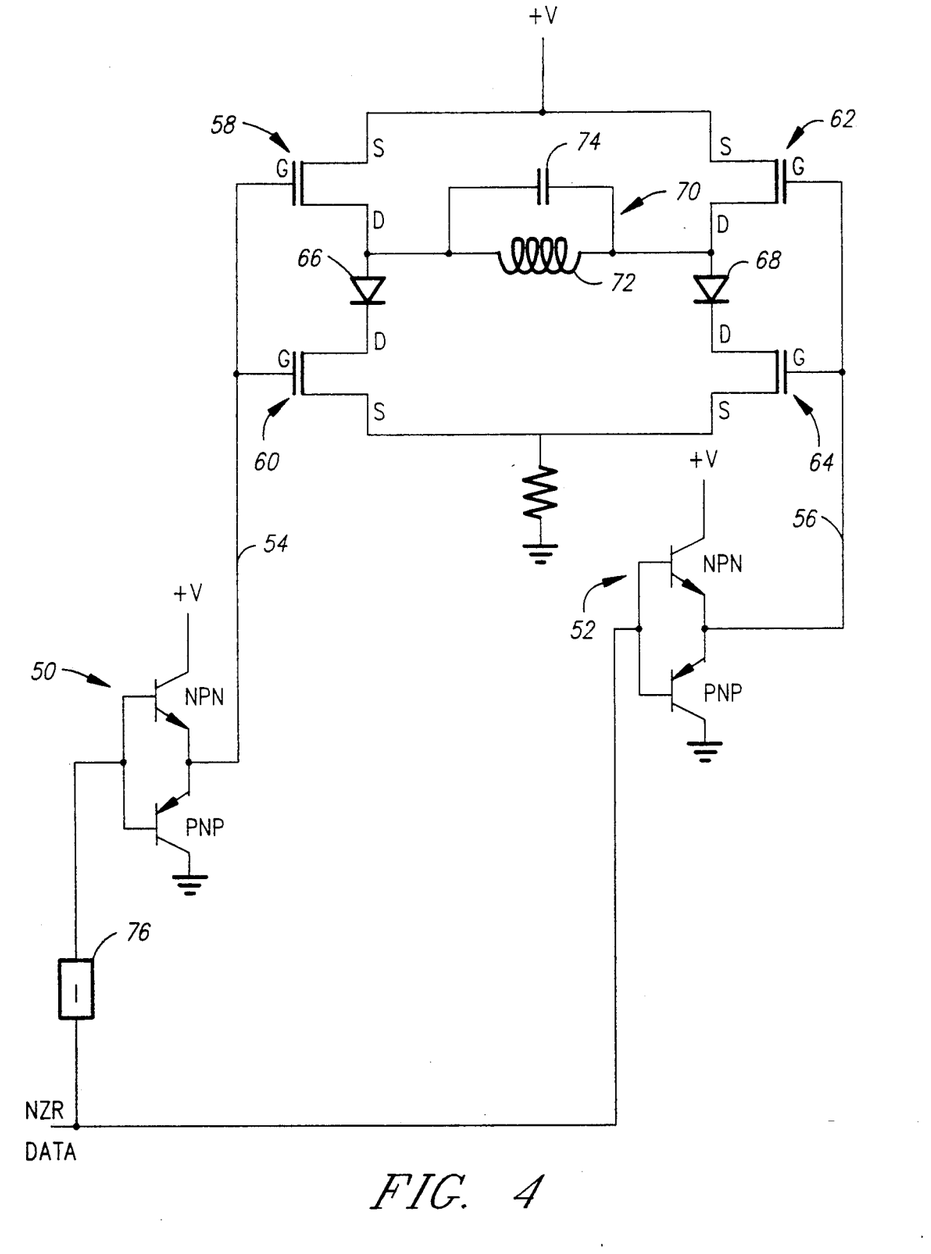
FIG. 4 is the preferred embodiment of the apparatus for direct overwriting using PWM recording.

A preferred circuit configuration for PWM recording, as illustrated in FIG. 4, comprises a pair of matched high frequency bipolar transistors 50,52. Each transistor 50,52 comprises an NPN and a PNP transistor. NRZ data, preferably in T²L logic, is supplied to the bases of each NPN and PNP transistor. The collector of each NPN transistor is connected to a voltage source +V, and the collector of each PNP transistor is connected to ground. The emitters of each associated NPN and PNP transistor are coupled to cause a data transition pulse to the bases of the transistors of 50 or 52 to provide an output signal to a line 54 or 56, respectively.

Line 54 is connected in parallel to the gates G of FETs 58,60, which preferably are MOSFETs. The sources S of these FETs are connected to a voltage source +V and to ground, respectively. The drain D of FET 58 is connected to the drain of FET 60 via an isolating diode 66. In similar fashion, line 56 is connected in parallel to the gates G of FETs 62,64, the sources S of which are connected to the voltage source +V and to ground, respectively. Drain D of FET 62 is connected to the drain D of FET 64 via an isolating diode 68. Magnetic head 70 comprises an inductor 72 and a capacitor 74 connected in parallel to and interposed between the drains D of FETs 58 and 62. Inverter 76 is interposed between the bases of bipolar transistors 50,52 to insure that the transistors are energized alternately.

In operation, assume that a data pulse energizes transistor 50. With transistor 50 energized and transistor 52 not energized, current will flow via p-channel FET 62, head 70, diode 66 and n-channel FET 60 to ground. The next data pulse will energize transistor 52. With transistor 52 energized and transistor 50 not energized, current will flow via p-channel FET 58, head 70, diode 68 and n-channel FET 64 to ground. Note that the current flow through head 70 is now reversed.

FETs 58, 62, 60 and 64 are arranged in a H-driver configuration common to the art. The addition of capacitor 74 and diodes 66 and 68, however, make this circuit different from the H-drivers heretofore proposed. Capacitor 74 serves as a place for inductive energy to flow temporarily during a transition and prevents this energy from being lost or having to be resupplied by the power supply.

Diodes 66,68 block current flow even when FET pair (58,64 or 62,66) is turned on because the electrical properties of a diode are such as to block current flow while the voltage on the diode is negative, which occurs during the energy transfer from inductor 72 to capacitor 74. Hence, magnetic head 70 is effectively disconnected from the rest of the circuit during each transition; i.e., the FETs and diodes in combination act to provide a period of time during each transition when the "switches" (like 38,42) are concurrently open, thereby producing voltage and current wave forms measured for magnetic head 70 as shown in FIGS. 3A and 3B.

Pulse Position Modulation Recording

Figure 5:
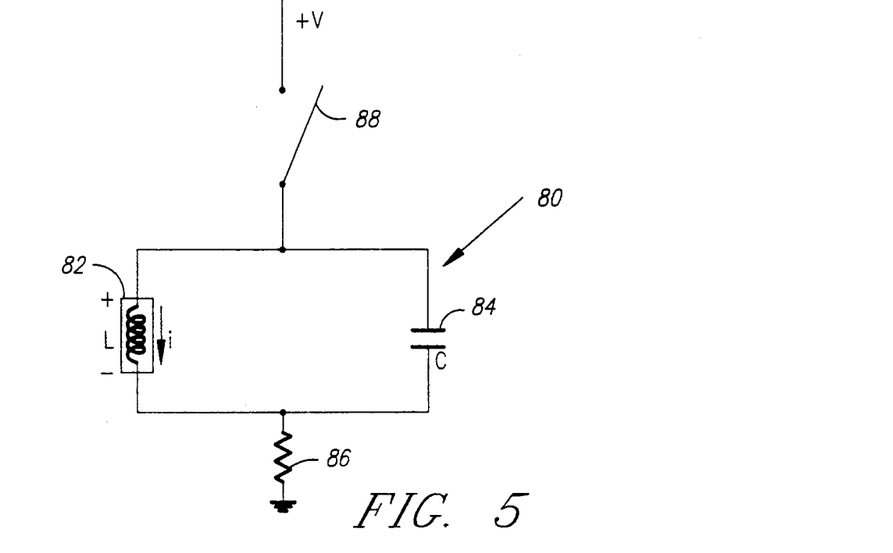
FIG. 5 is a schematic diagram of a switching circuit illustrating a variation of the invention for direct overwriting using pulse position modulation (PPM) recording.
Figure 6A:
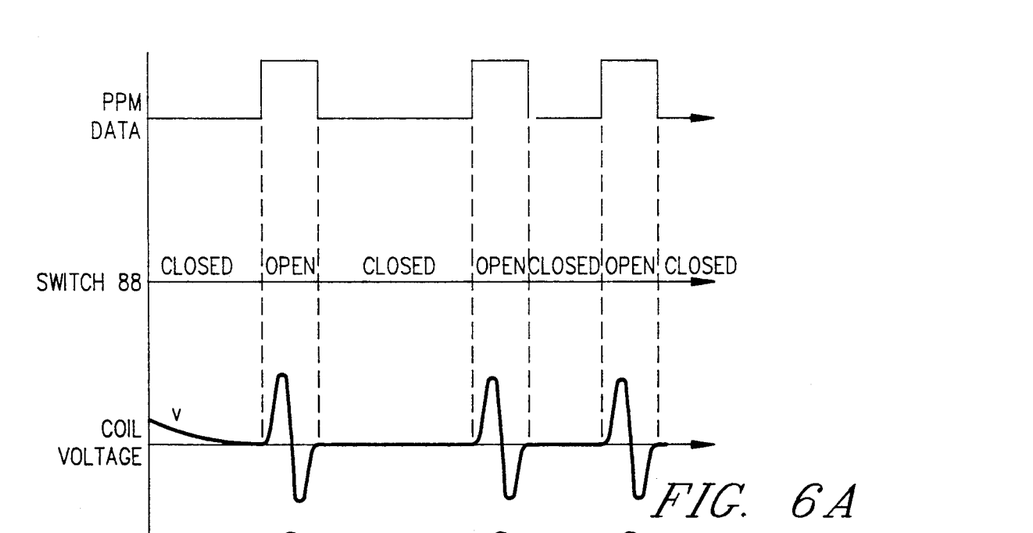
FIGS. 6A and 6B are voltage and current wave forms, respectively, for the circuit of FIG. 5.
Figure 6B:
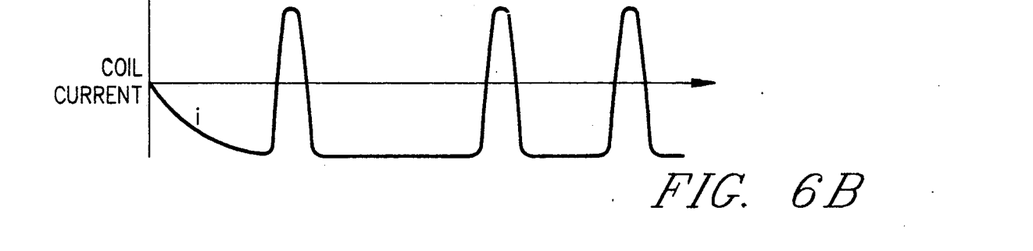

As illustrated in FIG. 5, a switching circuit for writing data using pulse position modulation (PPM) comprises a magnetic head 80. Head 80 comprises an inductor 82 and a capacitor 84 connected in parallel between a voltage source +V and a resistor 86 by way of a normally closed switch 88. Assume that switch 88 has been closed long enough for the circuit to reach a steady state wherein all current is flowing through inductor 82. When a pulse is to be recorded, switch 88 is opened for $2\pi\sqrt{LC}$ seconds—the time required for the energy to flow from inductor 82 to capacitor 84 and then back to inductor 82. The voltage and current wave forms are shown in FIGS. 6A and 6B, respectively. Since switch 88 is closed when the voltage across inductor 82 is 0, no transient will occur. The inductor voltage and current stabilize at constant levels after each pulse in the data stream, and the process repeats for succeeding pulses. Typically, for each 1 bit in the data stream, a mark is written.

Figure 7:
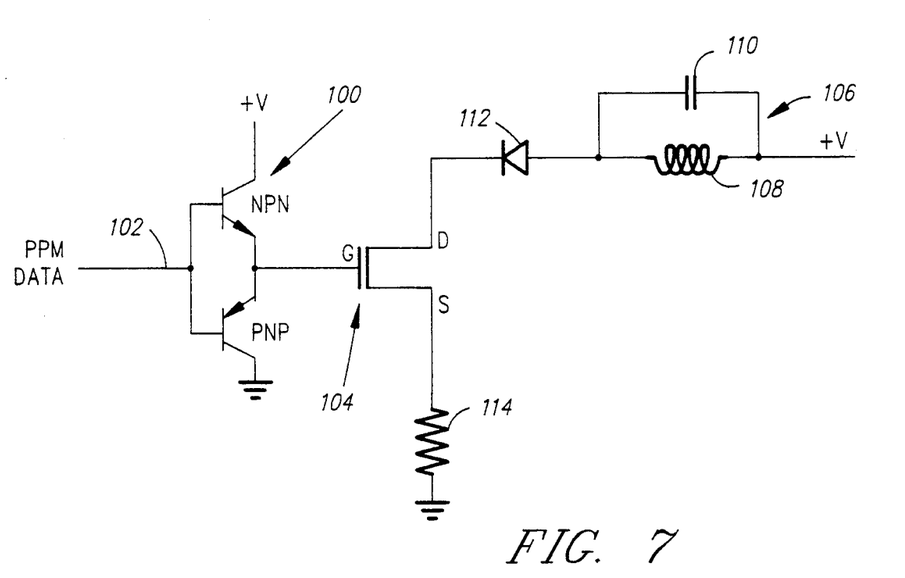
FIG. 7 is the preferred embodiment of the apparatus for direct overwriting using PPM recording.

FIG. 7 shows a preferred configuration of a circuit for writing data using PPM. This circuit comprises a high frequency bipolar transistor 100 consisting of an NPN transistor and a PNP transistor. When PPM data is supplied via a line 102 to the bases of the NPN and PNP transistors, an output signal is supplied via their commoned emitters to the gate of a FET 104. Magnetic head 106 comprises an inductor 108 and a capacitor 110 connected in parallel and interposed between a voltage source +V and a diode 112. Diode 112 is connected to the source of FET 104, the drain of which is connected to ground via a current source 114. FET 104 switches the current source 114.

In operation, the voltage on line 102 is normally high, which energizes transistor 100. This, in turn, energizes gate G of n-channel FET 104. With gate G turned on, current flows via head 106, diode 112, FET 104, and resistor 114 to ground. When a mark is to be written on the disk, the voltage on line 102 goes low momentarily. This turns off bipolar transistor 100 and this, in turn, turns off FET 104. Diode 112 prevents the negative induced voltage on head 106 from reverse biasing FET 104. Head 106 is effectively disconnected from the rest of the circuit while the applied voltage to line 102 is low. While head 106 is disconnected, the energy reversal takes place between inductor 108 and capacitor 110.

THEORY

The theory of the invention can most easily be demonstrated by reference to the LC circuit of FIG. 5, wherein the differential equation for the current flow is as follows:

$$L \frac{d^2 i}{dt^2} + \frac{1}{C} i = 0 \quad (1)$$

The following initial conditions must be satisfied by the solution $$i(0^+) = i(0^-) \quad (2)$$

$$i'(0^+) = i'(0^-) \quad (3)$$

Condition (2) must be satisfied because the current flow in an inductor, such as inductor 82, must be continuous. Condition (3) must be satisfied because the voltage across the capacitor 84 (which is equal to the voltage across the inductor) must also be continuous. Suppose now that an initial current is flowing in inductor 82, but there is zero voltage across it. Then $i(0) = I$ and $i'(0) = 0$. The solution to the equation (i.e., the current behavior) is $$i(t) = I_0 \cos \frac{1}{\sqrt{LC}} t \quad (4)$$

where I is the initial current flow. This function i(t) describes the shapes of the wave forms of FIGS. 3A, 3B, 6A and 6B during the time that the switches are off.

It should be noted that laser 24 may be a continuous wave (CW) laser. However, the beam of laser 24 preferably is turned off momentarily during each field reversal to reduce noise during magnetic transitions and turned on only when the magnetic field is substantially maximum. Or, if preferred, the laser beam may be modulated at a constant high frequency in phase synchronization with field reversals to reduce noise during magnetic transitions and turned on only when the magnetic field is substantially maximum.

While the invention has been shown and described with reference to preferred embodiments thereof, it will be understood by those skilled in the art that various changes in form and detail may be made without departing from the spirit and scope of the invention. Accordingly, the invention is not to be deemed limited except as specified in the claims.

What is claimed is:

1. A method for direct overwriting of data on an optical data storage medium comprising the steps of:
   directing a laser beam, non-modulated by data to recorded, at a selectable track on the medium for locally heating the medium to a condition for direct overwriting;
   providing a magnetic field generator for generating a magnetic field to the medium, the magnetic field generator comprising an inductor and a capacitor arranged in parallel with the inductor;
   providing current source means for supplying currents of first and second polarities;
   providing switch means connected to the inductor and the current source means; and
   controlling the switch means responsive to data to be recorded for supplying the first polarity current from the current source means to the inductor, stopping the flow of the first polarity current to the inductor for a period of time sufficient to reverse the magnetic field of the magnetic field generator by a reciprocation of energy between the inductor and the capacitor, and then supplying the second polarity current from the current source means to the inductor.

2. A method for direct overwriting of data on an optical data storage medium comprising the steps of:
   directing a laser beam, non-modulated by data to be recorded, at a selectable track on the medium for locally heating the medium to a condition for direct overwriting;
   providing a magnetic field generator for generating a magnetic field to the medium, the magnetic field generator comprising an inductor and a capacitor arranged in parallel with the inductor;
   providing a current source for supplying current of a first polarity;
   providing a switch means connected to the inductor and the current source; and
   controlling the switch means responsive to data to be recorded for supplying the first polarity current from the current source to the inductor, stopping the flow of the first polarity current to the inductor for a period of time sufficient to reverse the magnetic field of the magnetic field generator twice by reciprocation of energy between the inductor and the capacitor, and then supplying the first polarity current from the current source to the inductor.

3. An apparatus for direct overwriting of data on an optical data storage medium comprising:
   means for directing a laser beam, non-modulated by data, at a selectable track on the medium to locally heat the medium to a condition for direct overwriting;
   a magnetic field generator for generating a magnetic field to the medium comprising an inductor and a capacitor arranged in parallel with the inductor;

current source means for supplying currents of first and second polarities;

switch means connected to the inductor and the current source means for supplying the first polarity current from the current source means to the inductor, stopping the flow of the first polarity current to the inductor for a period of time sufficient to reverse the magnetic field of the magnetic field generator by reciprocation of energy between the inductor and the capacitor, and then supplying the second polarity current from the current source means to the inductor, the switching means controlled responsive to the data to be recorded.

4. The apparatus of claim 3, further comprising a voice coil actuator for mounting the inductor.

5. The apparatus of claim 3, wherein the switch means is comprised of a plurality of transistors and a plurality of diodes.

6. An apparatus for direct overwriting of data on an optical data storage medium comprising:

means for directing a laser beam, non-modulated by data, at a selectable track on the medium to locally heat the medium to a condition for direct overwriting;

a magnetic field generator for generating a magnetic field to the medium comprising an inductor and a capacitor arranged in parallel with the inductor;

a current source for supplying current of a first polarity; and switch means connected to the inductor and the current source, the switch means supplying the first polarity current from the current source to the inductor, stopping the flow of the first polarity current to the inductor for a period of time sufficient to reverse the magnetic field of the magnetic field generator twice by reciprocation of energy between the inductor and the capacitor, and then supplying the first polarity current from the current source to the inductor, the switch means controlled responsive to data to be recorded.

7. The apparatus of claim 6, further comprising a voice coil actuator for mounting the inductor.

8. The apparatus of claim 6, wherein the switch means is comprised of a transistor and a diode.

9. An apparatus for direct overwriting of data on an optical data storage medium comprising:

means for directing a laser beam, non-modulated by data, at a selectable track on the medium to locally heat the medium to a condition for direct overwriting;

a magnetic field generator for generating a magnetic field to the medium comprising an inductor having an inductance L and a capacitor having a capacitance C connected in parallel with the inductor;

current source means for providing currents in first and second directions;

current control means connected to the current source means and the inductor, the current control means allowing current to flow from the current source means to the inductor in the first direction, stopping the flow of the first direction current from the current source means to the inductor for approximately $\pi(LC)^{\frac{1}{2}}$ seconds and then allowing current to flow from the current source means to the inductor in the second direction, the current control means operated responsive to data to be recorded.

10. The apparatus of claim 9, further comprising a voice coil actuator for mounting the inductor.

11. The apparatus of claim 9, wherein the current control means is comprised of a plurality of transistors and a plurality of diodes.

12. An apparatus for direct overwriting of data on an optical data storage medium, comprising:

means for directing a laser beam, non-modulated by data, at a selectable track on the medium to locally heat the medium to a condition for direct overwriting;

a magnetic field generator for generating a magnetic field to the medium comprising an inductor having an inductance L and a capacitor having a capacitance C connected in parallel with the inductor;

a current source for providing current in a first direction; and current control means connected to the current source and the inductor, the current control means allowing current to flow from the current source to the inductor in the first direction, stopping the flow of current from the current source to the inductor for approximately $2\pi(LC)^{\frac{1}{2}}$ seconds and then allowing current to flow from the current source to the inductor in the first direction, the current control means operated responsive to data to be recorded.

13. The apparatus of claim 12, further comprising a voice coil actuator for mounting the inductor.

14. The apparatus of claim 12, wherein the current control means is comprised of a transistor and a diode.

* * * * *

UNITED STATES PATENT AND TRADEMARK OFFICE
CERTIFICATE OF CORRECTION

PATENT NO. : 5,121,369
DATED : June 9, 1992
INVENTOR(S) : Tarek Makansi It is certified that error appears in the above-identified patent and that said Letters Patent is hereby corrected as shown below:

On the Title page, item [54]: Title of the Invention and in Col. 1, line 5,

Insert -- AND -- after LASER BEAM

IN THE ABSTRACT:

Insert at end of Abstract, after "data to be written."

-- For pulse width modulation recording, the current normally supplied to the inductor is of one polarity and that supplied following the reversal is of opposite polarity; whereas for pulse position modulation recording, the current supplied to the inductor is of the same polarity before and after reversal. The inductor is preferably mounted for movement on a voice coil actuator and thereby maintained at a predetermined fixed distance from the medium. --

Signed and Sealed this

Twelfth Day of October, 1993

*Attest:*

BRUCE LEHMAN

*Attesting Officer*   *Commissioner of Patents and Trademarks*